Figure 1:
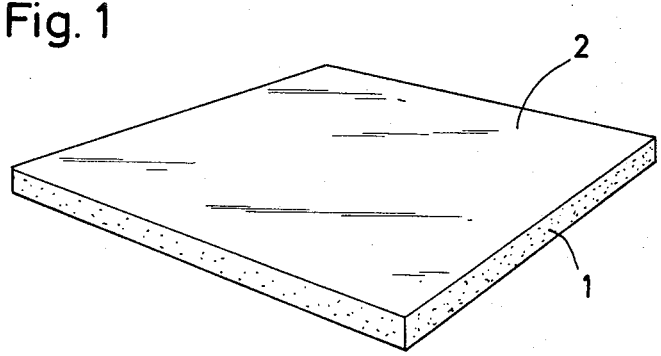

United States Patent [19]

Wartenberg

[11] 3,773,543
[45] Nov. 20, 1973

[54] PROCESS FOR THE PRODUCTION OF LUSTER COLOR COATINGS ON CERAMIC, GLASS OF SIMILAR BODIES

[76] Inventor: Erwin W. Wartenberg, Brunnenwiesen 6, Stuttgart, Germany

[22] Filed: Feb. 24, 1972

[21] Appl. No.: 228,954

[30] Foreign Application Priority Data
Feb. 25, 1971 Germany.................. P 21 08 849.3

[52] U.S. Cl.................. 117/37, 117/46 FC, 117/62, 117/71, 117/106, 117/107.2, 117/113
[51] Int. Cl.......................................... C23c 11/02
[58] Field of Search.................. 117/113, 107.2, 35, 117/105, 93.1, 64, 62, 93.3, 212, 37, 71, 106

[56] References Cited
UNITED STATES PATENTS
3,251,712   5/1966   Berger ............................. 117/113
3,163,733   12/1964   Ostrofsky et al................ 117/107.2
2,501,563   3/1950   Colbert et al...................... 117/93.1
3,087,831   4/1963   Browne............................... 117/105
2,904,432   9/1959   Ross et al. ............................. 117/35
3,647,566   3/1972   Szupillo .................................. 117/35
3,723,178   3/1973   Sohibarano......................... 117/212

OTHER PUBLICATIONS

Handbook of Chemistry and Physics, 48th Ed., The Chemical Rubber Co., 1967, pp. B-169.

Primary Examiner—Alfred L. Leavitt
Assistant Examiner—J. Massie
Attorney—Arnold B. Christen et al.

[57] ABSTRACT

A process for producing a luster color coating on porcelain, ceramic, glass or similar bodies comprises the application of a thin layer of a composition including a metal and oxides of that metal, and subsequently heating the coated surface.

24 Claims, 3 Drawing Figures

Patented Nov. 20, 1973 3,773,543

PROCESS FOR THE PRODUCTION OF LUSTER COLOR COATINGS ON CERAMIC, GLASS OF SIMILAR BODIES

The known, practically usable, colored luster glazes on porcelain, ceramic or glass articles must contain noble metals in order to bring forth the characteristic luster effect. During production of these luster glazes, so-called luster colors are painted onto a base and subsequently are fired at temperatures of about 500°C for a prolonged time in muffle ovens. The luster colors are obtained by conversion of suitable metal compounds, for example nitrates, into organic metal resinates. The latter are dissolved in volatile oils and are applied to the base with addition of a fluxing agent as a mass which can be painted on. During the firing process the organic components contained in the luster color are burned with a partially reductive effect on the metal compounds, whereby only the noble metals are reduced to metal and bring about the lustery shine, while the fluxing agent and the metal oxides formed during the burning process, for example iron oxides, take care of the color effect and the adhesion of the glaze on the surface.

The known luster glazes have considerable disadvantages, so that they have not yet found an entry into wide ranges of porcelain, ceramic and glass techniques. Because of the indispensable use of noble metal compounds — without these noble metals the lusters produced become dull and unsightly — the present luster glazes are expensive. Furthermore, the firing of the luster colors is a time consuming process. The known luster glazes furthermore are not very chemically stable and particularly not against alkalis.

The invention starts out with the object of improving these disadvantages of the known luster glazes and to apply color coatings at least equivalent to the known luster glazes onto a substrate, capable of reflection, such as for example enamels, porcelains, ceramics, glass, polished metals, etc., whereby these color coatings will, on the one hand, resemble in their appearance the known noble metal luster glazes but will be chemically considerably more stable as compared to those glazes, will be more resistant mechanically and can be produced above all more cheaply and more simply.

According to the invention this object is achieved in that a homogeneous coating in the form of thin layers, consisting of at least one metal existent in several valences and oxides of this metal is applied, and in that lasting color effects are created in said coating by subsequent heat treatment.

The application of this coating can be accomplished according to the invention by vaporizing in a vacuum, by cathode atomizing of the pertinent metal in oxygen, by spraying, dipping, etc. In the course of the heat treatment the substrata bearing this coating need only be heated to about 400° to 600°C for a short time. Iron and copper are particularly suited as metals from which, depending on the method of heat treatment, practically all colors from violet, blue through green, yellow, orange and red inclusive of metallic gold and silver effects can be obtained.

Essential advantages of the invention consist in that the luster coatings obtained, surprisingly and despite the usable low working temperatures, are chemically and mechanically more stable than the traditional luster glazes. The luster coatings according to the invention have proven, for example in endurance tests lasting for days, to be dishwasher safe and consequently they can be applied for example to everyday china. The luster coatings produced according to the invention also are more resistant than the known luster glazes against organic acids occurring in foodstuffs, such as lactic acid, citric acid, etc. Above all, however, the luster glazes according to the invention are not affected by alkalis, which is important for example in the case of bathroom tiles, which when in use as well as during cleaning come into contact with alkalis. The luster coatings according to the invention therefore are superior in many regards to the known luster glazes.

The subsequent description in connection with the various embodiments given by way of example will serve to further explain the invention.

Basically, the process according to the invention consists of two processes: In a primary process a homogeneous coating in the form of a thin layer, consisting of at least one metal existing in several valences and of oxides of said metals, is applied to the surface of a body used as a substrate, made for example of ceramic, glass, etc. In a subsequent secondary process, lasting lustrous color effects are generated in this coating by way of a heat treatment.

The application of the homogeneous coating in the form of the known physical "thin layers" in the primary process can take place, for example, by vaporizing in a vacuum, cathode atomizing of the pertinent metal in oxygen, spraying or by way of the submersion process. Basically all such methods are suitable. In contrast to the traditional process of luster glazes they are distinguished by the fact that the spreading or application of a luster color, which in itself is a cumbersome process, is omitted. Preferably, and because of its technical simplicity and the good results that can be achieved with it, the submersion process is used, on the basis of which the invention now will be explained further.

The substrate is heated in the primary process to a temperature above 200°C and subsequently is submerged into a heated liquid containing pyrolytically easily decomposable metal compounds, for example carbonyls or other organic metal compounds, dissolved in a low concentration. Around the submerged substrate, heated to the stated temperature, a gas jacket develops on the basis of the Leidenfrost phenomenon, which contains both molecules of solvents and the molecules of the metal compounds. The molecules of the metal compounds are pyrolytically decomposed on the heated surface of the substrate, partly including the molecules of the solvents as reaction partners and they form an even thin layer of a mixture made of metal oxide phases and possibly composition of changing carbide phases. The thickness of the layer lies in the order of magnitude of the wave length of the light. It can be regulated by adjustment of the concentration of the metal compounds in the submersion bath and/or by adjustment of the temperature of the substrate that is to be coated. The more molecules of the metal compound there are in the gas jacket, the greater will be the thickness of the layer at a stable submersion duration (concentration control). The higher the temperature of the substrate, the longer it will be possible to maintain the gaseous phase in the area of the surface of the substrate and the longer the gaseous phase lasts the larger will be the number of molecules reacting with one another (temperature control).

The regulation of the thickness of the layer is essential, since variable color effects can be achieved by it in the subsequent secondary process.

The thin layers obtained by the submersion process are evenly dark brown to black and, depending on the thickness of the layer and the substrate. The coatings have a relatively low reflecting power and they adhere more or less firmly on the base. However, the adhesion is not so strong that the coating is marproof. The coating likewise is soluble in a cold, diluted hydrochloric acid.

The succeeding secondary process for achievement of the actual luster effect and coloration consists in reheating the dark substrate provided with a coating produced in the primary process. This reheating can be accomplished in an electric furnace or by the use of gas burners with or without blowers. During heating in a furnace, normally an even shade will be obtained over the entire substrate. In the case of use of gas burners, there will be obtained different shades on the surface of the substrate. Differing from the primary coating, the coating achieved in the secondary process is distinguished by an improved adhesiveness to the base and by an increased chemical stability. For example, this coating is alkali resistant and no longer soluble in diluted HCl. It no longer is affected either by concentrated oxidizing acids.

For example, it will be possible by use of an iron/iron oxide layer produced from iron carbonyl to run the gamut of the entire luster-color-spectrum from black through blue, violet, brown, green, yellow to red including gold luster in the course of the heat treatment of the secondary process. The different colors are created during heating by means of redox processes and phase conversions. The colors can be controlled among other things by way of variation of the temperature or time, as well as by way of redox agents.

Luster coatings according to the invention in the form of thin layers, particularly those metal/metal oxide layers have a high reflecting power, such as iron or copper oxides whose reflecting powers in thin layers amounts to almost 50 percent. But even layers of oxides of cobalt, nickel, chromium and molybdenum still have a sufficient reflecting power to produce the desired luster effect.

As starting compounds for formation of the luster coating according to the invention, organic metal compounds, such as for example metal carbonyls, acetyl acetonates and esters are suitable. As solvents, mainly halogenated hydrocarbons or alcohols are used, in which the metal compounds are dissolved in a low concentration (about 0.01 to 5 percent). The solutions are filled into a heatable container in order to avoid evaporation losses and the container is provided with reflux cooling. The solution is heated for example up to the boiling point in order to facilitate the desired development of the gaseous phase required for vaporization. Subsequently the substrate heated in an electric oven to a temperature between about 200° and 700°C is submerged in the boiling liquid. The vaporization takes place below the liquid level in the above described form by development of a gaseous phase enveloping the substrate. The duration of the gaseous phase, which is equal to the duration of vaporization, depends on the temperature and the thickness of the wall of the substrate. In the case of the temperatures and wall thicknesses between about 1 and 5 mm, it lies in the order of magnitude of 10 to 100 seconds. After completion of the vaporizing process, the substrate is covered with an even black or brown layer, the thickness of which lies in the order of magnitude of a few thousand Angstrom.

The primary layer of coating nevertheless adheres on the base so strongly that it cannot be removed by customary washing and scrubbing agents. On the other hand, it is easily soluble in a diluted hydrochloric acid.

Subsequently the real development of the colored luster takes place in the secondary process by variable heating of the substrate provided with the primary coating. During this time metal oxide mixtures with a high refractive index and highly reflective quality, develop mainly as a result of the oxidation process and phase conversions, which produce the desired luster effect, similar to a colored metallic brilliancy.

If the secondary process is allowed to take its course in an electric oven at an even temperature, then even single color luster coatings will be obtained. By covering up parts of the substrate during heating, variable colors will be achieved on the surface. By heating with a gas burner, for example a Bunsen burner, certain patterns or drawings will be obtained on the coated surface of the substrate, whereby in this case the shades will come out differently in the individual, reducing or oxidizing zones of the flames. By use of a burner, according to the invention a kind of flame painting can be produced. Also, by placing for example electrically heated metal dies onto the lightly preheated and precoated surface of the substrate, one will be able to apply a reproducible pattern provided on said metal die. Also, by partially dissolving the primary coating, for example with a diluted hydrochloric acid and by subsequent heating, patterned effects can be produced. Also, by way of a diluted local heat treatment, for example with a laser beam, there can be achieved strictly limited patterns, for example pictures and letterings.

The duration of the primary and secondary processes according to the invention together amounts to about 10 minutes and thus also lies further below the conventional luster glaze technique, in the case of which the firing process alone takes as a rule usually several hours.

Since the oxidation process and phase conversion will have started already at a relatively low temperature, a multitude of differentiated shadings and color transitions are possible in contrast to the classical type of production of a luster glaze by spreading on and firing, which shades impart an unmistakable appearance to the products produced according to the invention, which clearly can differ in color combination and luster from the traditional luster glazes.

The process according to the invention is suitable both for the production of artistically high grade individual pieces and for mass production, since all work steps can take place continuously on assembly lines. A special feature of the process according to the invention consists in that, although one can proceed in accordance with principles of mass production, still it will be possible by controlled variations during the secondary process to produce in a simple manner varying patterns of color and shape in each individual article. This can be achieved for example through the fact that heating is accomplished by clustered gas flames which continuously move on certain paths of patterns, whereby each change of the pattern path will result in a change of the decoration. The required variations of movement of the gas flames can be controlled for example electrically, electronically, pneumatically or mechanically, so that a large number of similar but not identical individual articles can be produced which have the character of handmade pieces.

In the following pages the invention will be described further on the basis of some embodiments given by way of example.

EXAMPLE 1

In an electric muffle oven heated to 600°C, a glazed porcelain cup is heated for 4 minutes and subsequently is lowered into a submerged vessel provided with a reflux cooler, in which there is a boiling 1 percent solution of iron pentacarbonyl in butanol. The temperature of the porcelain cup at the beginning of the submersion process amounts to about 400°C. Around the porcelain cup a gas jacket develops inside the submersion bath, which contains both butanol and iron pentacarbonyl molecules. The carbonyl molecules are decomposed pyrolytically on the surface of the porcelain and they form an even thin layer of a mixture consisting predominantly of iron and iron oxide phases of low valences and variable composition. After 30 seconds the vapor deposition process is completed, whereupon the cup is removed from the bath. The layer on the cup has a thickness of approximately 5,000 Angstrom and a black color. The layer has a firm adhesion and it cannot be removed by customary washing and scouring agents. In a diluted hydrochloric acid it quickly dissolves.

The cup coated with the layer is heated subsequently in a muffle oven heated to 700°C during 1 minute, whereby the originally black layer changes to a deep, strongly reflective steel blue. During its stay in the muffle oven the porcelain cup reaches a temperature of about 250°C.

When the porcelain cup is heated for an additional minute in the muffle oven, a change of color in the layer toward violet takes place. After three additional minutes of heat treatment, this color changes to a highly reflecting golden red, which will not change any more as a result of additional heating. In contrast to the oxide mixed phases of low valency achieved at first, the oxidation now produces $Fe_2O_3$ in the air in the muffle oven. In this state the porcelain cup has a temperature of about 600°C. After this heat treatment the coating solidly adheres to the support and cannot be removed by rough mechanical scouring treatment and is insoluble in diluted hydrochloric acid.

EXAMPLE 2

A porcelain cup is heated for 2 minutes in an electric muffle oven at a temperature of 600°C. The cup reaches a temperature somewhat more than 200°C. Subsequently one proceeds as in the case of carrying out the primary process in which the coating had been applied in a submersion bath, as in Example 1. The thickness of the coating obtained amounts to about 2,000 A, which, in comparison to Example 1, is to be traced back to the lower heating of the porcelain cup.

Afterwards, the cup is heated for three minutes in a muffle oven at 700°C, whereby the originally brownish-black layer changes over into a highly reflecting yellow, which is deceptively similar to a gold coating.

EXAMPLE 3

A porcelain cup is heated as in Example 1 and is placed in a submersion bath in which there is a 0.5% iron pentacarbonyl solution in butanol. A brownish-black iron/iron oxide coating of about 2,000 A thickness develops.

The cup treated in this manner is subsequently subjected in the secondary process to the same heat treatment as in Example 2. The same golden yellow coating will result as in Example 2.

EXAMPLE 4

A glass plate is heated for 5 minutes in an oven at 700°C and is subsequently inserted into a submersion bath with a two percent iron pentacarbonyl. As a result of the vapor deposition process continuing in the submersion bath inside the gas jacket formed around the glass plate, the plate is covered with a deep black metal/metal oxide layer of more than 5,000 A.

Now the plate coated with this layer is further treated as in Example 1. Depending on the duration of heating, intermediate shades between blue and red, for example green, brown, orange, dark yellow, will develop. These shades are produced as a result of the differently proceeding oxidation process inside the thick layer and they can be controlled by changing the temperature and duration of heating.

EXAMPLE 5

A porcelain cup which was coated in the primary process, as in Example 4, is heated in the center of its concavely arched inside by means of a locally fixed Bunsen flame striking perpendicularly. In the center of the cup and depending on the duration of heating, rings of color will develop with the shades described in Examples 1 and 4, which are always variable in the reductive and oxidative zones of the Bunsen flame.

EXAMPLE 6

A glazed ceramic tile is coated in a primary process as described in Example 4. In the succeeding secondary process a coloration takes place as in Example 5 and only the Bunsen burner is moved across the entire flat surface of the tile for the sake of achieving a decorative pattern, whereby the moving burner fulfills the function of a "heat brush." A decorative pattern consisting of various shades will be obtained on the tile.

EXAMPLE 7

A ceramic tile is coated in the primary process as in Example 4. After that, a part of the tile is prepared in accordance with the previously determined decorative patterns by covering it with some heat reflecting material, namely, a metal foil, and it subsequently is heated in the secondary process in an oven. The not covered parts of the tile, fully exposed to the radiation heat, will be oxidized more quickly than the covered parts. As a result of that, shades of colors of various types develop all across the surface of the tile, which extend from black via blue, violet, brown to red and yellow, and which can be controlled depending on the thickness or degree of reflection of the covered or not covered zone.

EXAMPLE 8

A ceramic tile or a porcelain object is coated in the primary process according to Example 1, 3 or 4 and is heated in the secondary process by a series of locally fixed burner elements combined to form groups, for example, gas blower burners, which have a certain geometric arrangement and are located close in front of the surface of the tile or the object. Color patterns will form on the tile or object which have the geometric configuration of the burner groups. By different geometric arrangements of the burners any geometric pattern can be applied. The burners in this case carry out the functions of a heat "plunger."

EXAMPLE 9

A ceramic tile is coated as in Example 1 in a primary process. The coloration in the secondary process is accomplished by an electric metal plunger heated to 700°C and having a certain relief pattern, which is brought directly into contact with the coated surface of the tile. A color pattern develops on the tile which corresponds to the pattern of the hot stamp. The tile also can be heated prior to applying the stamp to it.

EXAMPLE 10

A porcelain cup is coated in a submersion bath according to Example 1 and subsequently is heated on a spiral shaped heater coil adapted to the shape of the cup. At the points of contact between the cup and the heater coil a color pattern develops which corresponds to the pertinent shape of the heater coil.

EXAMPLE 11

A porcelain cup coated in a submersion bath according to Example 1 is treated with diluted hydrochloric acid on its inside, whereby the coating on the inside is dissolved. Subsequently the cup is subjected to one of the heat treatments mentioned in the previous examples for development of color patterns on its outside.

EXAMPLE 12

On a porcelain plate coated by submersion according to Example 1, a diluted hydrochloric acid is applied in a certain pattern by means of a brush. At those places of the layer coming into contact with the acid, the layer is dissolved either in whole or in part depending on the duration of the action of the acid. Subsequently, after the acid is washed off, the plate is heated. Different types of color patterns develop. A similar effect will be achieved if a felt stamp saturated with diluted hydrochloric acid is used instead of the brush, in which stamp the desired geometric pattern already has been preformed as a relief.

EXAMPLE 13

An object made of glass, ceramic, porcelain or enamel and coated in a submersion bath according to Example 4 is heated in zones by a Bunsen burner or a gas blower burner, whereby the ratio of gas to oxygen in the flame of the burner is varied during heating. The different oxidation and reduction zones developing thereby within the flame produce variable colors or shades on the layer, which turn out bright in the oxidative ranges and dark in the reductive ranges.

EXAMPLE 14

A porcelain cup is heated variably within the different areas by means of a Bunsen burner and is immersed in a submersion bath as in Example 1. Depending on the temperatures of the cup prevailing in the particular ranges, coatings of various layer thicknesses will develop. In the succeeding heat treatment of the porcelain cup in a muffle oven, various shades of the colors develop depending on the thickness of the layer.

EXAMPLE 15

Examples 1 to 14 are repeated, whereby chromocarbonyl $Cr(CO)_6$ is used instead of iron pentacarbonyl as a primary coating substance. In the course of the secondary heat treatment, predominantly yellow to green luster colors develop depending on the thickness of the layer.

EXAMPLE 16

Examples 1 to 14 are repeated, whereby molybdenum-carbonyl $Mo(CO)_6$ in a trichloroethylene solution is used instead of the iron pentacarbonyl in butanol. In a primary coating produced with this substance, one can also produce the most diverse color shades in the secondary heat treatment process.

EXAMPLE 17

Examples 1 to 14 are repeated, whereby cobaltcarbonyl $Co(CO)_4$ in a quantity of 0.5 percent in chlorobenzene is used instead of the iron pentacarbonyl in butanol. The secondary heat treatment succeeding the primary coating will result in overwhelmingly olive green to black colors.

EXAMPLE 18

Instead of a one substance submersion solution, a solution of several substances is used, for example, from 0.5% $Co(CO)_4$ and 0.5% $Fe(CO)_5$. Chlorobenzene or butanol is suitable as solvent. In this case too, different and especially green colors will result in the course of the secondary heat treatment.

In all the preceding examples the metal/metal oxide layer was applied in the submersion bath in the primary process because this is the method which can be carried out most simply in practice. In additional embodiments given by way of example it was found, however, that the primary coating also can be applied by way of vapor deposition in a vacuum, by cathode atomizing of the metal in oxygen or by spraying. In the succeeding secondary process the same shades of color will result as mentioned in the preceding examples. Since in these modified embodiments, given by way of example, nothing basically different results, there is no need here to make further explanations.

If in addition to the luster effect an iridescence of the coated object also is desired, a thin $SnO_2$ or $TiO_2$ layer is applied prior to the primary process or after the secondary process, for example, by vapor deposition or by spraying. This will result in additional charming decorative effects and an increased mechanical and chemical resistance of the luster coating.

The invention relates not only to the processes described but it also comprises objects provided with a luster coating, for example, tiles, chinaware, etc.

Figure 2:
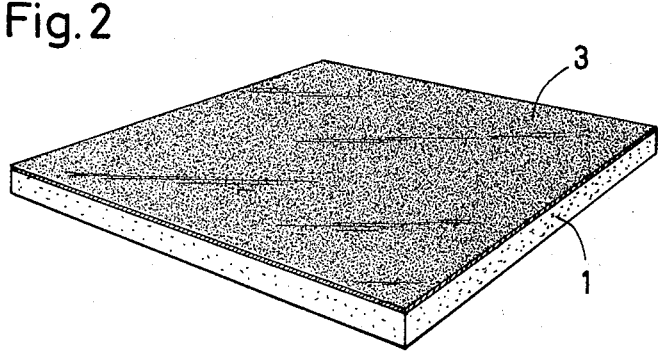
Figure 3:
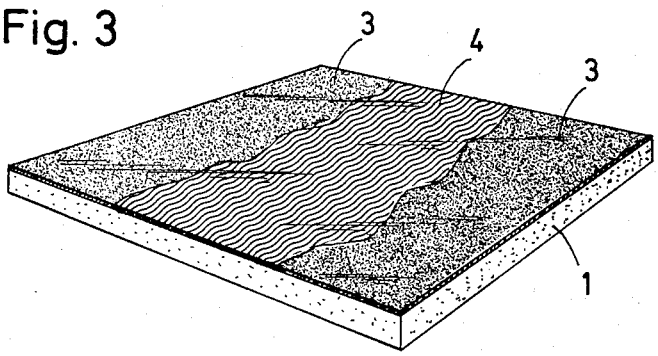

In the drawing an object in the form of a decorative tile and obtained according to the process of the invention has been shown. FIG. 1 shows the untreated tile 1 with its glaze surface 2. In FIG. 2 a thin layer 3 of iron/iron oxides has been applied to the surface of tile 1 in the primary process according to the invention. Layer 3 has a dark brown to black coloration. FIG. 3 shows tile 1 after the heat treatment carried out in the secondary process according to the invention, which was done in such a way that a colored, namely, a blue area 4, has formed in layer 3.

In the case of a modified execution of the invention, the secondary process can be accomplished in such a way that the heat content of the heated body itself, which is provided with the coating, is utilized for the subsequent heat treatment of the coating made of metal and metal oxide. This can be carried out most advantageously when the coating is produced by immersion of a heated body into the submersion bath. In this case the body is heated prior to immersion correspondingly highly and is submerged for such a period of time that the body will cool off merely in the area of its surface carrying the coating. After removal from the submersion bath, the surface area again is heated by heat conduction from the inside of the body, so that the luster colors will develop.

This process is particularly advantageous because an additional heat source, such as an oven, for the secondary process becomes unnecessary. As a result of that, a saving of up to two-thirds of the otherwise required time as well as production costs will be achieved. The process can be applied particularly favorably to substrates which are only partially glazed, for example wall tiles which are glazed only on one side, since in this case no wetting of the wall tile with the submersion liquid takes place because of the momentary immersion, which, under certain circumstances and in the case of certain glazes, can lead to the formation of cracks.

It furthermore has been found that a gaseous phase will develop above the surface of a boiling submersion bath containing the pertinent metal compounds at atmospheric pressure, which gaseous phase is suitable for the development of a coating on the basis of the metal compounds likewise contained in it whenever the body that is to be coated is brought into this gaseous phase. Since, apparently, the effective metal compounds are distributed more unevenly in this gaseous phase than they are in the submersion bath, marbled effects in this manner also can be produced in the finished luster coating.

The above mentioned development of the luster colors from the primary coating resulting from the effect of the remaining heat content also can be avoided if the surfaces of the body bearing the coating are cooled immediately during removal of the body from the submersion bath, for example by blowing air onto it.

The subsequent examples serve as explanation of the modified embodiments of the invention.

EXAMPLE 19

A wall tile glazed on one side and of about 5 mm thickness with a surface of about 11 × 11 cm is heated in a muffle oven to about 550°C and is immersed subsequently into a 0.5 percent solution of iron pentacarbonyl in butanol for a brief time of 2 seconds. A dark gray to black coating develops, which, immediately upon removal of the wall tile from the solution and without additional heating, changes its color into golden yellow within a few seconds.

EXAMPLE 20

Example 19 is repeated, whereby however a 3% pentacarbonyl solution in butanol is used. A deep red luster coating develops.

EXAMPLE 21

The process according to Example 19 is repeated on the same wall tile directly 5 times in succession. A luster coating of a deep red color as in Example 20 will be obtained.

I claim:

1. Process for the production of colored luster coatings on the surface of a substrate made of porcelain, ceramic, glass and similar substances, comprising the steps:
   a. preparing a liquid solution of at least one pyrolytically decomposable metal component in an organic solvent, said metal of the component existing in several valencies;
   b. heating said solutions to approximately boiling;
   c. heating said surface of the substrate to a temperature above the boiling temperature of said solution and being in a range between about 400°– 1,000°C;
   d. contacting said heated surface of the substrate with said heated solution and forming a gas jacket between the surface and the solution by evaporating said solution on said heated surface;
   e. precipitating from said gas jacket a single thin dark, black, brownish or grey layer having a thickness between 500 and 10,000 A of a mixture of said metal and oxides of said metal;
   f. separating said substrate from said solution;
   g. heating said thin dark layer of metal and metal oxides and developing by said heating colors in said layer varying from blue to green, red and yellow in dependence of the thickness, temperature and heating time of said layer.

2. Process according to claim 1, which includes the step of applying an additional layer of a composition of the group which includes an oxide of tin or titanium to the surface of said layer of metal and metal oxides to produce an iridescent effect.

3. Process according to claim 1, characterized in that said contacting is done by submerging said heated surface in said heated solution.

4. Process according to claim 3, characterized in that said organic solvent comprises an organic solvent of the group which includes halogenated hydrocarbons, alcohols, and chlorobenzene.

5. Process according to claim 3, in that said pyrolytically decomposable compound comprises the group which includes carbonyls of iron, copper, chromium, molybdemum and cobalt and organic metal compounds including acetyl acetonates and esters.

6. Process according to claim 3, characterized in that the concentration of the metal compound in the solvent lies between about 0.01 and 5 percent.

7. Process according to claim 3, characterized in that the body is heated to a temperature between about 400° and 700°C. prior to its submersion in said heated composition.

8. Process according to claim 1, which includes said solution of regulating the concentration of the metal compound in the bath to produce a predetermined thickness of the coating.

9. Process according to claim 1, which includes the steps of regulating the temperature of heating of the surface to be coated to produce a predetermined thickness of the coating.

10. Process according to claim 1, which includes the step of heating said substrate carrying said layer in an oven.

11. Process according to claim 10, characterized in that the oven temperature is adjusted to a value between about 200° and 800° C.

12. Process according to claim 3, which includes the step of applying a flame to produce a pattern of different colors in said layer.

13. Process according to claim 3, which includes the step of applying a heated metal plunger having a relief pattern to said layer to produce a color pattern on said layer.

14. Process according to claim 3, which includes the step of applying an acid liquid to at least a portion of said layer to remove said portion prior to said subsequent heating to produce a patterned effect.

15. Process according to claim 3, characterized in that the surface of the substrate to be coated is heated to a temperature within the range of 400° to 600°C. prior to submersion in said heated composition.

16. Process according to claim 15, which includes the step of regulating the temperature to which the substrate surface to be coated is heated to produce a predetermined color of the coating.

17. Process according to claim 15, which includes the step of shielding a portion of the substrate surface to be coated with a heat reflective metal during application of heat to said surface to produce a predetermined pattern of said coating.

18. Process according to claim 3, which includes the step of regulating the thickness of the coating applied to the surface of the substrate to produce a predetermined color by varying the concentration of said metal compound in said solution.

19. Process according to claim 3, which includes the step of regulating the temperature of the surface of said substrate to be coated to produce a predetermined thickness of said coating.

20. Process according to claim 1, characterized in that said surface comprises a portion of a body, and includes the step of heating said body to said temperature above said boiling temperature of the coating solution, prior to said contacting step, the heat absorbed in said body providing the heat for said subsequent heat treatment.

21. Process according to claim 20, characterized in that said heated body is submerged in said coating solution for a period of time in the range of 0.5 to 5.0 seconds.

22. Process according to claim 21, which includes the step of removing said body from submergence in said coating solution, and repeating the step of submerging said body in said solution.

23. Process according to claim 21, characterized that said step of submerging the body to be coated in a solution having a pyrolytically decomposable metal compound is undertaken at atmospheric pressure.

24. Process according to claim 21, which includes the step of cooling said body after being submerged in said solution.

* * * * *